United States Patent [19]

Fekete, deceased

[11] Patent Number: 4,962,462

[45] Date of Patent: * Oct. 9, 1990

[54] FUEL CELL/BATTERY HYBRID SYSTEM

[75] Inventor: Imre Fekete, deceased, Late of Piscataway, N.J., by Anna M. Fekete, Administratrix

[73] Assignee: Engelhard Corporation, Iselin, N.J.

[*] Notice: The portion of the term of this patent subsequent to Jun. 5, 2007 has been disclaimed.

[21] Appl. No.: 344,464

[22] Filed: Apr. 26, 1989

Related U.S. Application Data

[63] Continuation of Ser. No. 233,192, Aug. 17, 1988, abandoned, which is a continuation of Ser. No. 51,212, May 13, 1987, abandoned, which is a continuation of Ser. No. 894,473, Aug. 4, 1986, abandoned, which is a continuation of Ser. No. 537,459, Sep. 29, 1983, abandoned.

[51] Int. Cl.[5] ........................ H02J 7/00; G06F 15/20
[52] U.S. Cl. .................... 364/492; 180/65.8; 320/3; 364/424.05
[58] Field of Search ........................ 364/492, 493, 505; 324/431.01, 415, 416; 307/65, 66, 80, 81; 429/7, 9; 320/2, 3, 15, 16, 61; 180/65.3, 65.8

[56] References Cited

U.S. PATENT DOCUMENTS

| | | | |
|---|---|---|---|
| 3,423,599 | 1/1969 | Hovious | 320/15 |
| 3,443,115 | 5/1969 | Timmerman, Jr. | 320/3 X |
| 3,683,258 | 8/1972 | Harbonn | 320/61 |
| 3,821,626 | 6/1974 | Maver et al. | 320/3 |
| 3,823,358 | 7/1974 | Rey | 320/15 |
| 3,904,947 | 9/1975 | Crews | 180/65.8 X |
| 3,971,454 | 7/1976 | Waterbury | 180/65.8 |
| 3,987,352 | 10/1976 | Hirota | 320/3 |
| 4,000,003 | 12/1976 | Baker et al. | 429/7 |
| 4,017,779 | 4/1977 | McDonald et al. | 320/15 |
| 4,025,860 | 5/1977 | Shibata et al. | 320/15 |
| 4,056,764 | 11/1977 | Endo et al. | 320/15 X |
| 4,095,664 | 6/1978 | Bray | 180/65.8 X |
| 4,277,737 | 7/1981 | Müller-Werth | 180/65.8 X |
| 4,287,465 | 9/1981 | Godard et al. | 320/61 X |
| 4,405,891 | 9/1983 | Galloway | 320/15 |
| 4,498,551 | 2/1985 | Arbisi | 180/65.5 |

FOREIGN PATENT DOCUMENTS

| | | |
|---|---|---|
| 1103821 | 2/1968 | United Kingdom . |
| 1473798 | 5/1977 | United Kingdom . |

OTHER PUBLICATIONS

3rd, Intl. Elec. Veh. Expo, May 1980, "Fuel–Cell–Powered Golf Cart", Re Bobbett et al. pp. 1–25.

IEEE Spectrum, Mar. 6, 1969, pp. 83–90; G. R. Frysinger; "The Economical Fuel Cell".

Journal of the electrochemical Society, vol. 130, No. 8, Aug. 1983, p. 331C, abstract No. 376, J. J. Early et al. "An Integrated Fuel Cell/Battery Power System for a Forklift Truck".

Primary Examiner—Kevin J. Teska

[57] ABSTRACT

A fuel cell/battery hybrid power system is disclosed which has a microprocessor based control system. The control system enables the fuel cell to be taken out of the system by a switch when its predetermined maximum desired energy output is about to be exceeded by load requirements. The battery is protected from overdischarge through a switch.

10 Claims, 2 Drawing Sheets

FUEL CELL/BATTERY HYBRID SYSTEM

This is a continuation of co-pending application Ser. No. 233,192, filed on Aug. 17, 1988, which is a continuation of Ser. No. 051,212, filed on 5/13/87, which is a continuation of Ser. No. 894,473, filed on 8/4/86, which is a continuation of Ser. No. 537,459, filed on 9/29/83, all now abandoned.

BACKGROUND OF THE INVENTION

This invention relates to hybrid power systems and, more particularly, to the control of such systems.

Cross reference is hereby made to two copending applications filed in the U.S. Patent Office and assigned to the same assignee as this application: application of J. Werth and I. Fekete entitled "Fuel Cell/Battery Hybrid System Having Battery Charge-Level Control", Ser. No. 06/537,460, filed Sept. 29, 1983, now U.S. Pat. No. 4,931,947; and application of J. Early and J. Worth entitled "Fuel Cell/Battery Control System", Ser. No. 07/296,283.

In planning for future energy needs based on an evaluation of existing and potential economic and ecological problems, a great deal of attention is being given to the development and utilization of energy efficient systems. Of particular interest are devices capable of generating electricity by consuming plentiful or renewable fuels, the utilization of which minimizes environmental pollution which is economically justified. Fuel cells and gas turbines utilizing low weight hydrocarbons or hydrogen obtained by reforming methanol or similar organic fuels represent likely candidates in this area. The fuel cell typically has a high efficiency and is largely without polluting emissions. Noteworthy also is the versatility of the fuel cell in respect to size and power level which is by adaptability to a modular design. Additionally, the fuel cell requires few moving parts, and is a quiet, reliable and comparatively maintenance free source of electric power.

The above factors have made the fuel cell a likely candidate for use in specialized vehicle transportation where needs are well defined and long-standing. Unfortunately, fuel cells do not generally operate as well as desired under conditions in which substantial variation in the load or surge demand are encountered. Fuel cell components can be damaged by surge demands due to overheating, or the surge demand may not be met at all. To overcome this problem, attempts have been made to utilize fuel cell stacks as primary energy sources in a so called "hybrid system", the purpose of which is to allow use of the major energy source (fuel cell) in a near optimum design by supplying only the average load requirements directly therefrom.

Such a system includes a storage source, such as a battery, to supply the transient load increases and which can be recharged when the load drops below average. Thus, the load variation experienced by the primary energy source or fuel cell is reduced in frequency and magnitude. This allows for design and operation of the fuel cell to be within a band representing the average load rather than designing for peak load with dominant operation under peak load conditions.

Reduced emissions and increased efficiency are the expected benefits for operating the hybrid system. A prior art type of hybrid power device is disclosed in an article by J. B. O'Sullivan et al "Hybrid Power Source For Material Handling Equipment", *IECEC* 1975 *Record*, pp 229-236. In the system described by O'Sullivan, four fuel cell stacks are in parallel with a battery sub-system. A controller controls the fuel cell and battery sub-systems to limit the total current from the fuel cell to maintain the fuel cell's life and to limit the fuel cell sub-system voltage as protection for the batteries. At low currents, the fuel cell sub-system voltage rises rapidly and fully charged batteries would be drive into strong gasing if not protected. The O'Sullivan controller operates to vary a series resistance between the fuel cell stack and the batteries, resulting in a variable voltage drop to maintain the voltage constant at the battery at low currents and maintain the voltage constant at the fuel cell at high currents.

Although the system described in O'Sullivan provides an approach to control of the system, the degree of control may not be optimal since significant resistive losses occur during operation. Further, O'Sullivan does not specify how the sharing of load current demand is provided between the fuel cell stack and the batteries. Therefore, it appears that the O'Sullivan system does not provide a technique in which the peak surge energy demands in a hybrid system are compared to the average load requirements, and appropriate adjustments are made in the system, so that either the batteries alone or the fuel cell and the battery are utilized in some combination to meet the load demand in a most efficient manner.

In addition to the O'Sullivan article, the following U.S. patents are of general interest in the fuel cell area: U.S. Pat. Nos. 4,000,003; 3,883,368; 3,753,780; 3,546,020; and 3,473,337, and are mentioned herein as a matter of general background.

Other fuel cell/battery hybrid systems of interest are disclosed in "Fuel Cell Systems for Vehicular Applications", SAE Technical Paper Series, 800059, by Lynn, McCormick, Bobbett and Derouin, Feb. 25-29, 1980; "A Fuel Cell-Battery Power Source for Electric Vehicles", The Fifth International Electric Vehicle Symposium, 782407(E), by Dowgiallo, Oct. 2-5, 1978; UK Patent Application GB No. 2 084 387 A, published on Apr. 7, 1982; "An Assessment of the Status of Fuel Cell/Battery Vehicle Power Systems", by Escher and Foster, February, 1980; Fuel-Cell-Powered Golf Cart Report CONF-800523-1 of the Third International Electric Vehicle Exposition and Conference, St. Louis, Mo., by Bobbett, McCormick, Lynn, Kerwin and Derouin, May, 1980.

SUMMARY OF THE INVENTION

The present invention provides an improved hybrid power system wherein an energy storage means, such as batteries, and a primary energy source, such as a fuel cell stack, are selectively and automatically connected in parallel circuitry through switching means to a common load, under control of a microprocessor. The system is designed so that the power output of the primary electrical energy source does not exceed a maximum design power output and the energy storage means may be controlled so that it has a predetermined desired maximum and minimum level of charge maintainable at all times. A controller regulates these aspects for optimum use of the hybrid system.

In an embodiment of the invention, a load sensor is provided to monitor the load current and sensors can be provided to measure the state of the charge at each of the batteries. If the load sensor indicates a very high load current, the microprocessor activates the appropriate switching means such that both batteries are connected to the load with the fuel cell stack disconnected. If the load sensor indicates a high current demand, the microprocessor causes both batteries and the fuel cell stack to be connected into the load. If the load sensor indicates a medium current demand, the fuel cell stack and the battery which has a higher state of charge is connected by the microprocessor to the load. Finally, if the load sensor indicates a low current load demand, the fuel cell and any of the batteries that are charged to a value less than a predetermined value are connected into the system. In essence, the system described herein manages energy transfers between the storage device and the primary energy source in an electric hybrid system, such as a fuel cell-battery system.

In an embodiment of the invention, the batteries and the fuel cell stack are either connected to or disconnected from the common load in a sequence determined by a microprocessor based on instantaneous load demand and battery state of charge conditions. As a result, system surge capability is enhanced while peak power output of the primary energy source is controlled. Although the system is operable with a single battery, it is preferred in some embodiments that at least two or more batteries be utilized since a multiple-battery system enhances system reliability by avoiding the problem of a single bad cell in one of the batteries causing the entire system to become inoperable. The concept also provides operational flexibility in that, while one battery is being cycled, the other battery equalizes and cools off. The system also enhances flexibility in system configuration and package design. This embodiment also provides means for enhancing the overall efficiency of the hybrid system since various energy source combinations are possible depending on the battery charge level and the current load. Switching between the power sources is arranged to provide for maximum efficiency by allowing the fuel cell stack to operate close to its average rated power output for all load demand conditions. The fuel cell, when connected to the load, is also utilized to charge the batteries as appropriate, the shifting of load to the fuel cell stack minimizing battery-run down by avoiding battery overcharge or overdischarge. This aspect extends battery life.

In an embodiment of the invention, a first and second battery are used with a fuel cell, the batteries each having a desired minimum level of charge during operation. If on system start up, both batteries are fully charged, the first is used as a surge battery until it nears or reaches its desired minimum level of charge. At that time, the second battery replaces the first as the surge battery and the first is recharged by the fuel cell during periods, of low load conditions.

BRIEF DESCRIPTION OF THE DRAWINGS

The foregoing aspects and other features of the invention are explained in the following description, taken in connection with the accompanying drawings wherein.

DETAILED DESCRIPTION

Figure 1:
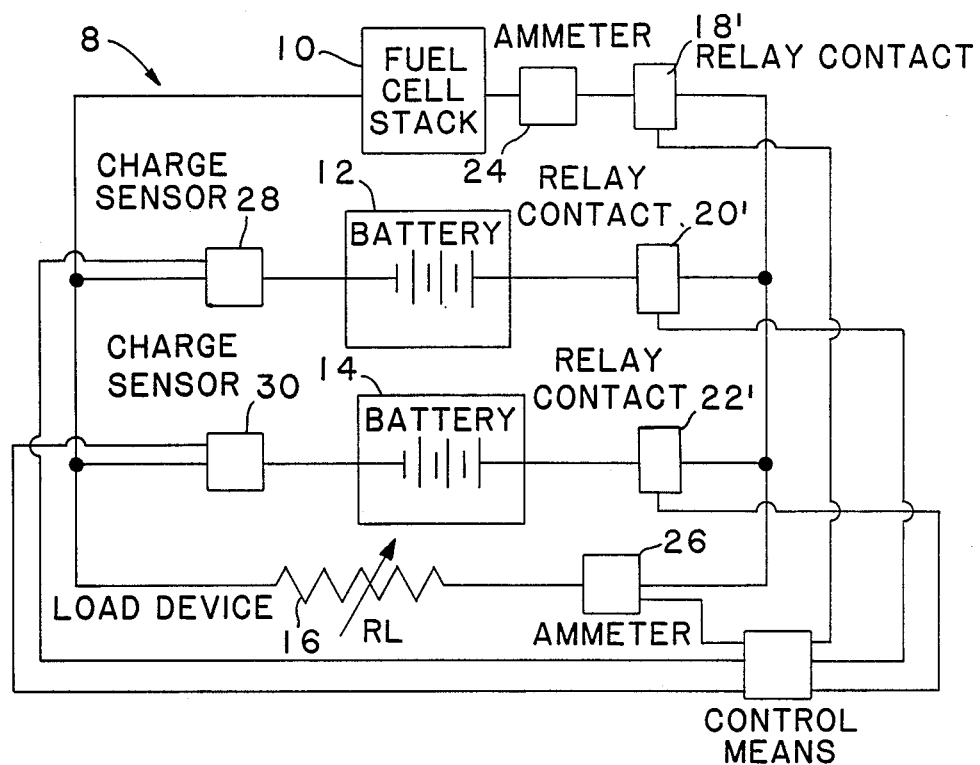
FIG. 1 is a schematic diagram of the hybrid system of the present invention.

Referring now to FIG. 1, a schematic diagram of the hybrid system of the present invention is illustrated. The primary energy source 10 comprises a fuel cell stack utilized in conjunction with two batteries, 12 and 14. Batteries 12 and 14 are generally rated in terms of open-circuit voltage, ampere-hour capacity, and internal impedance. Both batteries operate as high power density storage devices and both are connected in parallel to fuel cell stack 10 in a manner to be described hereinafter. Although two batteries, 12 and 14, are preferably utilized in the system described, either a single battery or more than two batteries could also be utilized.

A load device 16, representing, for example, the current demand from a motorized vehicle, is connected in parallel across the energy sources 10, 12 and 14 as illustrated. A plurality of relay contacts 18', 20' and 22' are connected in series with energy sources 10, 12 and 14, respectively, as illustrated. As will be described in more detail hereinafter, if the contacts 18', 20' and 22' are caused to be in their closed position, the associated energy source is, in turn, connected to the load 16. Current sensing devices 24 and 26, typically ammeters, are included in series with fuel cell 10 and load 16, respectively, as shown.

Charge sensors 28, and 30 are coupled in series with energy sources 12 and 14, respectively, and function to sense the energy source charge level. Typically, such devices comprise an integrating coulombmeter which integrates the amperes in and out of the battery to track the total coulombs received and delivered by the battery. The charge sensor may incorporate a reset circuit to reset the coulombmeter periodically to compensate for drift in the coulombmeter. The coulombmeter can be a separate unit within the system or its function could be incorporated in the microprocessor described hereinafter.

Figure 2:
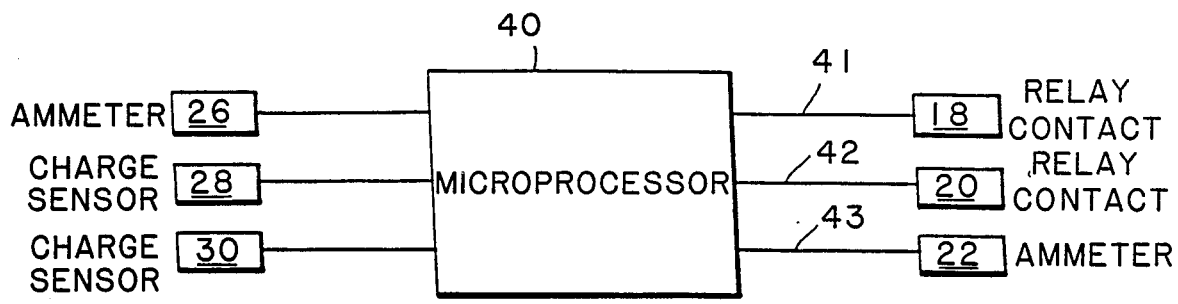
FIG. 2 is a block diagram illustrating the use of a microprocessor to control which power source or sources is to be utilized to supply the common load in the circuit of FIG. 1.

FIG. 2 is a block diagram of the microprocessor-based control system used to determine which combinations of energy sources are to be connected to the load 16. In particular, a programmable microprocessor 40, such as the Zilog Z80 microprocessor chip, the operation of which is described in Zilog Publication "Z80-CPU/Z80A-CPU Technical Manual", dated September, 1978 is responsive to the output from load sensor 26 and charge sensors 28 and 30. Output signals from microprocessor 40 are coupled to relays 18, 20 and 22 via leads 41, 42 and 43, respectively, relays 18, 20 and 22 controlling respective contacts 18', 20' and 22' shown in FIG. 1.

In essence, the output of load sensor 26 determines the operational mode of hybrid power system 8. As will be set forth in more detail hereinafter, four modes of operation selected corresponding to a very high, high, medium, and low load currents.

The qualitative definition of a low mode is one in which the entire load can be delivered by the fuel cell alone without help from any battery. The medium mode is where the fuel cell requires the assistance of at least one battery to meet the load demand without the fuel cell being overloaded. The high mode is where the fuel cell and two batteries would be required to meet the demand, one battery not being sufficient. The very high mode is where the fuel cell would have to be disconnected because, even with both batteries assisting, the fuel cell would be overloaded and subject to damage.

In a representative 5 kilowatt system, for example, a low mode would correspond to a load rating not higher than approximately 6 kilowatts (e.g., 50 volts, 120 amperes); the medium mode would correspond to a load rating not higher than approximately 10 kilowatts (e.g., 200 amperes); the high mode would correspond to a load rating not higher than approximately 15 kilowatts (e.g., 300 amperes); and the very high mode would correspond to a load rating not higher than approximately 25 kilowatts (e.g., 500 amperes).

It should be noted at this point that adapting a microprocessor, such as the aforementioned Zilog Z80, to control various process operations such as the switching sequences described herein, can be accomplished by one of ordinary skill in the art having familiarity with the particular process requirements. It should also be noted that a circuit having standard analog or digital components could be utilized in lieu of microprocessor 40 to provide the required switching sequence.

Referring back to FIG. 2, if the load sensor 26 determines that the load current is very high, microprocessor 40 generates signals on leads 41, 42 and 43 such that contact 18' is opened and contact 20' and 22' are closed, to connect batteries 12 and 14 in parallel to the load 16 while the fuel cell is disconnected from load 16. If the load sensor 26 detects a high load current, a signal is applied to relays 18, 20 and 22 so that each of the appropriate contacts 18', 20' and 22' are closed, each of the energy sources 10, 12 and 14 therefor being connected in parallel to provide the current demand of load 16.

If the load sensor 26 detects a medium condition, microprocessor 40 generates a signal on lead 41 such that relay 18 is activated, contact 18' being closed thus connecting fuel cell stack 10 to load 16. In this case, the microprocessor 40 first senses the battery charge levels as determined by sensors 28 and 30. The microprocessor determines whether battery 12 or 14 has the higher state of charge and that battery is connected by the microprocessor to the load 16 by energizing the appropriate relay. In other words, if sensor 28 indicates that battery 12 has a higher state of charge than the charge of battery 14 as determined by sensor 30, relay 20 is activated such that corresponding contact 20' (FIG. 1) is closed connecting battery 12 to load 16, while contact 22' remains open. If the charge level determination is reversed, relay contact 22' is closed and relay contact 20 is opened, connecting battery 14 to load 16. In both these cases, relay contact 18' is closed, connecting fuel cell 10 to load 16.

Finally, if the load sensor 26 determines that a low load current is demanded, relay 18 is activated, closing relay contact 18' and thus connecting fuel cell 10 to load 16. Microprocessor 40 then determines which of the batteries 12 and 14 is charged to less than a predetermined level, typically the 90% level. All those batteries which are less than that predetermined level are then connected into the circuit by closing the appropriate contacts via relay 20 or 22 as required or needed. Specific variations of the above microprocessor control scheme are set forth hereinbelow with reference to Tables I-IV.

The present invention is further explained with reference to Table I in which the switching mode of the primary electrical energy source, such as the fuel cell in this embodiment, and the first and second batteries are shown with respect to four general load demand or mode conditions. A minimum acceptable battery charge of 70% and a maximum of 90% is assumed, although variation in range is permissible, depending on the environment in which the system is used.

In Table I, at "Low" sensed current demand, for example, if both batteries are assumed to be at an arbitrary preset maximum 90% charge level, then no charge is imposed even though load demand on the primary energy source is less than the rated constant output of the primary energy source. It is noted that four possible battery configurations may be provided.

Under "Medium" sensed load (Table I), the primary energy source plus either battery 12 or 14 are available to meet a demand somewhat exceeding that provided by the primary electrical energy source. This choice may be mandated as battery 12 in one instance and battery 14 in the other, depending on which is more highly charged. Such is then also the case in Tables II, III and IV, at a comparable demand level, since the battery of higher sensed potential, within the selected maximum and minimum range of 90%-70% charged level, is automatically selected as the surge battery to supplement the primary electrical energy source, while the second battery remains in open (non-flow) bias.

Under "High" sensed energy demand (Table I), both batteries 12 and 14 and the primary energy source are utilized to fully meet power demands on the system substantially in excess of the output of the primary energy source. The response is consistent at this surge demand (see also Tables II, III) so long as the charge on each battery is greater than a preset 70% minimum charge level or other convenient minimum depending upon use of the system. When both batteries are charged as shown in Table IV, neither battery would be connected when the load is low. The microprocessor is tied into all the switches to accomplish their change of states when desired to function as intended.

In all of the Tables used herein, the following legends are used:
O—Open Contact—no current flow
+—Closed Contact—Current flow in parallel
C—Charging Mode

TABLE I

| SENSED LOAD | FUEL CELL 10 | BATTERY 12 | BATTERY 14 |
| --- | --- | --- | --- |
| Very High | 0 | + | + |
| High | + | + | + |
| Medium | + | + | 0 |
|  | + | 0 | + |
| Low | + | 0 | 0 |
|  | + | 0 | C |
|  | + | C | 0 |
|  | + | C | C |

Table II further exemplifies operation of the system of Figure I when one of the batteries 12 is at 90% charge and the other battery 14 at 85%.

TABLE II

| SENSED LOAD | FUEL CELL 10 | BATTERY 12 (90% chg.) | BATTERY 14 (85% chg.) |
| --- | --- | --- | --- |
| Very High | 0 | + | + |
| High | + | + | + |
| Medium | + | + | 0 |
| Low | + | 0 | C |

Table III further exemplifies operation of the system of Figure I when both batteries have a relatively low charge level but equal or exceed a preset 70% minimum charge level.

TABLE III

| SENSED LOAD | FUEL CELL 10 | BATTERY 12 (70% chg.) | BATTERY 14 (75% chg.) |
| --- | --- | --- | --- |
| Very High | 0 | + | + |
| High | + | + | + |
| Medium | + | 0 | + |
| Low | + | C | 0 |
|  | + | C | C |

Table IV further exemplifies operation of the instant system when battery 14 is at a 90% charged level and battery 12 is also at a 90% charged level.

TABLE IV

| SENSED LOAD | FUEL CELL 10 | BATTERY 12 (90% chg.) | BATTERY 14 (90% chg.) |
| --- | --- | --- | --- |
| Very High | 0 | + | + |
| High | + | 0 | + |
| Medium | + | 0 | + |
| Low | + | 0 | 0 |

The batteries 12 and 14 are recharged by the fuel cell stack 10. In particular, whenever the charge sensors 28 and 30 indicate that the state of charge is greater than 90% during the operating part of the power cycle, the batteries are prevented from continuing to charge and thus, are disconnected from fuel cell stack 10 under control of microprocessor 40. Otherwise the batteries would be damaged. At the same time, if the state of charge falls below some minimum state of charge; i.e., 70%, the battery would not be allowed to discharge any further unless needed to meet the load. It would be a very unusual condition for either battery to be required to supply power and be 70% charged at the same time if the system is designed appropriately.

It should be noted that the battery does not have to be disconnected from the load in order to be recharged if the load is low. For example, if the state of charge of a battery is 80%, the battery is within the safety limits and the battery can either charge or discharge. Therefore, the battery can be connected to both the load and to the fuel cell stack and if the load is light, the battery will accept charge. If the load is heavy, the battery is discharging. When the limits are reached, the battery is connected at low current only if it needs to be charged or at medium current only if it needs to be discharged.

Figure 3:
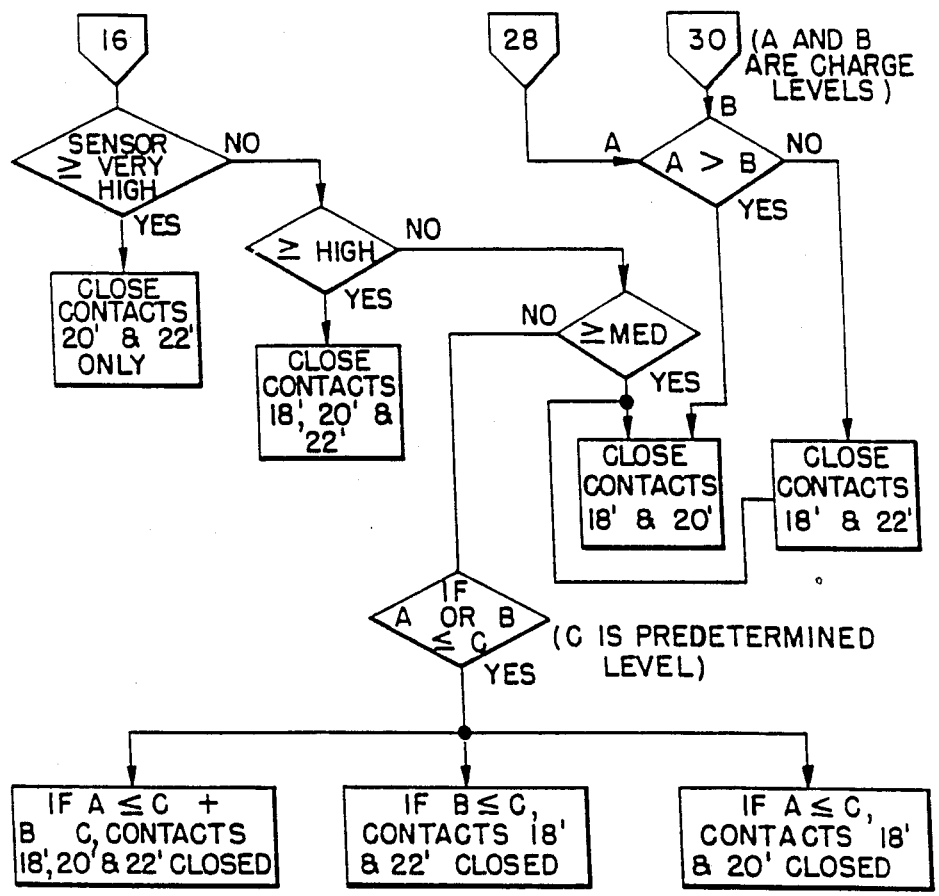
FIG. 3 is a flow chart depicting a typical program for operation of a microprocessor in the system of FIG. 2.

In another similar embodiment of the system a single energy storage means, such as a battery, can be used in combination with switches and a fuel cell to maintain an optimum hybrid system. In such an embodiment, the state of charge in the battery is continuously sensed and fed to the controller to determine if and when the battery is in danger of being overcharged. The load current is also continuously monitored by the controller to determine which of three ranges of load conditions the system is operating under at any given instant. First, there is the low range within which the current is capable of being met by the fuel cell alone. Second, there is the medium range within which the load current is capable of being met by the output of the fuel cell together with the battery. Third, there is the very high range within which the load current is so high that even if the fuel cell and battery were together supplying current to the load, the current output of the fuel cell would have to be more than its predetermined load rating. The predetermined load rating of the fuel cell is designed into the system beforehand and is usually based on average load expected rather than all possible load surge levels. The flowchart of FIG. 3, which shows a typical program for operation of the microprocessor 40, is abbreviated in that return blocks are omitted for simplicity of illustration. As indicated elsewhere herein, such programs are well known and those skilled in the art will readily recognize the variations and additions which may be made to FIG. 3.

Figure 4:
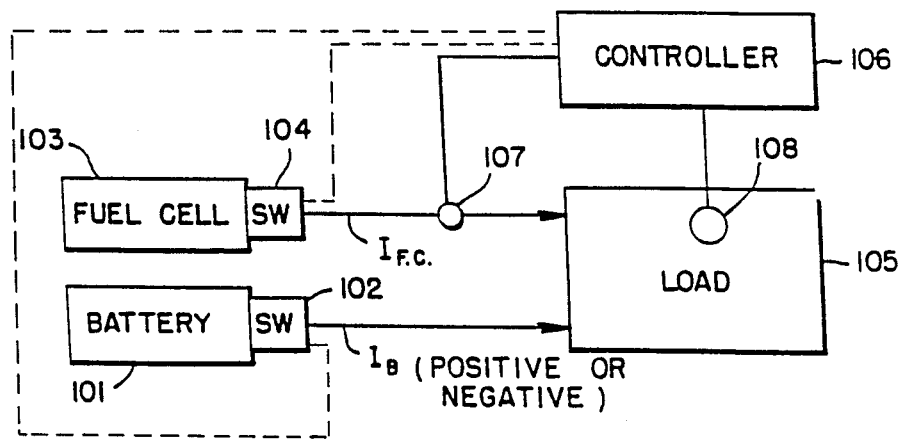
FIG. 4 is a schematic illustration of a single battery/fuel cell hybrid control system.

A schematic illustration of this embodiment of the simple, single battery/fuel cell system is shown in FIG. 4. Fuel cell 103 produces current as required by the load 105 and/or battery 101 for recharging the battery. Fuel cell 103 has a switch 104 which connects and disconnects it from load 105 and battery 101. Battery 101 also has a switch, switch 102, which connects and disconnects it from load 105 and fuel cell 103. The system also contains a suitable control means such as controller 106 which measures the current produced by the fuel cell 103 via current sensor 107 and the current drawn by load 105 via current sensor 108. From these two current values, the current flowing to and from the battery 101 can be calculated as well as the state of charge within the battery. The state of charge in battery 101, can be calculated by well known integration techniques, based on its current flow, by the controller 106.

Within the range of operating conditions of the system described in FIG. 4, switches 104 and 102 can produce a combination of switch conditions to optimize the operation of the system. For instance, under condition of low load and of battery 101 being in danger of overcharging, switch 102 is disconnected or opened while switch 104 is connected or closed. The reason for this is to prevent the battery from being overcharged. If, conversely, switch 102 were allowed to be connected under these conditions, that portion of the current flowing from the fuel cell which was not drawn by the load would flow into battery 101 thereby tending to overcharge it.

Under high load conditions in the system of FIG. 4, switches 102 and 104 are both connected or closed. The reason for this is that the current drawn by the load is too high to be satisfied by the predesigned capability of the fuel cell alone. Under very high load conditions of the system on FIG. 4, switch 104 is disconnected or opened and battery switch 102 is connected or closed. The reason for this is that if both switches were connected, the current requirements of the load would force the fuel cell beyond its predetermined output capability.

The following technique may be used in bringing the fuel cell back on line after very high load conditions occur. Such action can be carried out by measuring the voltage of the load at the point that the fuel cell is disconnected therefrom under very high load conditions and storing it in the controller. After the very high load conditions pass and lower load conditions are reinstated, such as high or low load conditions referred to above in FIG. 4, switch 104 should be connected to enable fuel cell 103 to produce current for load requirements. The precise time for bringing the fuel cell 103 back into the system can be determined by sensing the load voltage continuously after very high load conditions begin, and closing switch 104 when the same sensed voltage reappears as the very high load conditions dissipate. Alternatively, the load current existing just before or at the disconnect of switch 104 as very high load conditions appear can be sensed and placed into the memory of controller 106 so that as load conditions are lowered below the very high load conditions, as indicated by the load current being compared to the level placed in the memory of the controller, switch 104 can again be connected to bring the fuel cell 103 onto the system.

The following Tables V through VII depict the various conditions of the system elements similarly to the previous Tables. However, there are only three operating load conditions instead of four; low, high and very high, for this embodiment.

Table V shows a general case of the various possibilities in connecting the fuel cell and battery under the three load range conditions of the embodiment in FIG. 4.

TABLE V

| SENSED LOAD 105 | FUEL CELL 103 | BATTERY 101 |
|---|---|---|
| Very High | 0 | + |
| High | + | + |
| Low | + | 0 |
|  | + | C |

Table VI shows the three operating load conditions when battery 101 is 90% charged, or fully charged for this case.

TABLE VI

| SENSED LOAD 105 | FUEL CELL 103 | BATTERY 101 (90% chg.) |
|---|---|---|
| Very High | 0 | + |
| High | + | + |
| Low | + | 0 |

Table VII shows the three operating load conditions when battery 101 is 80% charged and can be recharged during low load conditions.

TABLE VII

| SENSED LOAD 105 | FUEL CELL 103 | BATTERY 101 (80% CHG.) |
|---|---|---|
| Very High | 0 | + |
| High | + | + |
| Low | + | C |

Thus, it can be seen that the control system disclosed herein can utilize one, two or more batteries with the fuel cell. Each battery utilized can have a switch associated therewith which can connect and disconnect it to the system as dictated by the microprocessor. The system may also have means to sense the fuel cell current, the load current and the state of charge in the batteries The batteries may have a desired predetermined maximum and minimum state of charge during operation and one of the batteries, in a multiple battery system, may be used as the surge battery until it reaches its predetermined minimum charge level. At such time another battery in the system of high charge level can replace it and the battery recharged by the fuel cell under low load conditions. Also, in a two battery system, the surge battery can be selected by whichever battery is at the highest charge level.

The present invention thus provides many advantages over the prior art hybrid power systems. In particular, a commercially available microprocessor may be utilized to function with a proper combination of energy sources coupled into the load in a manner such that the load capacity of the fuel cell is not exceeded while the system surge capability is enhanced. The above system protects the batteries against overcharge and overdischarge and also protects the fuel cell from overloading by sensing the battery charge levels and the load current, respectively, and switching the batteries and the fuel cell to obtain the best possible and most efficient system utilization.

It is to be understood that the above described embodiment of the invention is illustrative only and that modifications thereof may occur to those skilled in the art. Accordingly, this invention is not to be regarded as limited to the embodiment disclosed herein, but is to be limited only as defined by the appended claims.

I claim:

1. A hybrid power source system for supplying electrical current to a load and for controlling the amount of current supplied in response to current demand from the load, comprising:

a primary electrical energy source couplable to the load through a first switch means associated therewith and having a predetermined maximum desired power output;

first energy storage means couplable to the load in parallel with the primary electrical power source through a second switch means associated therewith;

second energy storage means couplable to the load in parallel with the primary electrical power source through third switch means; either said primary electrical energy source, said first, and said second energy storage means or combinations thereof being connected to the load in parallel to supply current to the load depending upon whether said first, said second or said third switch means or a combination thereof is approximately energized;

load current sensing means for sensing the current flowing into the load; and control means responsive to said load current sensing means for selectively energizing either said first, second or third switch means in a manner such that the current demand on said primary electrical energy source is maintained at or below approximately its predetermined maximum desired power output level.

2. The system of claim 1 wherein if said load current sensing means senses a very high current, then said control means renders said first switch means open and said second and third switch means closed whereby said primary energy source is disconnected from the load and said first and second energy storage means are connected to the load.

3. The system of claim 1 wherein if said load current sensing means senses a high load current then, in response thereto, said control means connects said primary energy source and said first and second energy storage means to the load.

4. The system of claim 1 including first and second charge sensor means for sensing the state of charge of said first and second energy storage means and generating first and second signals, respectively, and further including means for coupling said first and second charge sensor means to said control means whereby said first and second signals are sensed by said control means.

5. The system of claim 4 wherein said control means comprises a microprocessor.

6. The system of claim 1 wherein said first and second energy storage means comprise storage batteries and wherein said primary electrical energy source comprises a fuel cell stack.

7. The system of claim 6 wherein said two batteries are of identical capacity.

8. The system of claim 6 wherein the number of batteries is greater than two.

9. The system of claim 8 wherein there is a switch means associated with each battery which connects and disconnects said each battery.

10. A hybrid power source system for supplying electrical current to a load and for controlling the amount of current supplied in response to current demand from the load, comprising:
- a primary electrical energy source couplable to the load through a first switch means associated therewith and having a predetermined maximum desired power output;
- energy source means couplable to the load in parallel with the primary electrical power source through a second switch means; either said primary electrical energy source or said energy storage means or combinations thereof being connected to the load in parallel to supply current to the load depending upon whether said first or second switch means or a combination thereof is appropriately energized;
- load current sensing means for sensing the current flowing into the load;
- charge sensor means for sensing the state of charge in said energy storage means; and
- control means responsive to said load current sensing means for selectively energizing one or both of said first and second switch means in a manner (i) such that the current demand on said primary electrical energy source is maintained at or below approximately its predetermined maximum desired power output level, and (ii) to recharge said energy storage means as needed at a time said primary electrical energy source is operating below its predetermined maximum desired power output.

* * * * *